United States Patent Office 3,677,910
Patented July 18, 1972

3,677,910
TIN-PLATING METHOD AND ELECTROLYTE
Wilfred Pickles, Hazel Grove, Stockport, England, assignor to Ciba-Geigy Corporation, Ardsley, N.Y.
No Drawing. Filed Mar. 6, 1969, Ser. No. 804,982
Claims priority, application Great Britain, Mar. 9, 1968, 11,614/68
Int. Cl. C23b 5/14, 5/46
U.S. Cl. 204—54 R    12 Claims

ABSTRACT OF THE DISCLOSURE

A method of tin-plating is disclosed which comprises electrodepositing, on a surface to be plated, tin from an acid plating bath containing a condensation product of phenol and aliphatic polyol containing from 2 to 8 hydroxyl groups, at least one of which hydroxy groups pertains preferably to a divalent hydroxy methylene group, the number of carbon atoms of the polyol varying preferably from 3 to 12 carbon atoms. Use of ethylene oxide addition products of said condensation products and sulfated derivatives of said condensation products and said ethylene oxide addition products is also disclosed.

---

The present invention relates to a new electroplating process and a bath for use in said process, and in particular to an electroplating process and bath for the electrodeposition of tin or tin-alloys on to a metal substrate, especially iron and steel substrates.

Acidic tin-plating baths containing tin cations in either the stannous or stannic form, together wtih small amounts of organic additives, have been used commercially for many years. Typical organic additives which have been used include glue, cresol, tar-oil, condensation products of amines with aldehydes and isomers of dihydroxydiphenyl sulphones. The organic additives were introduced to try to increase the range of current density over which acceptable plating could be obtained.

We have now found that products of high activity in this respect combined with good solubility properties in tin-plating baths, may be derived from the reaction of phenol with an aliphatic polyol.

According to the present invention, there is provided a method of tin-plating which comprises electrodepositing tin from an acidic tin-plating bath comprising an additive produced by heating together at an elevated temperature phenol and an aliphatic polyol containing from 2 to 8 hydroxyl groups and having preferably from 3 to 12 carbon atoms per molecule.

The phenol starting-material may be, for instance, phenol derived from the decomposition of cumene hydroperoxide or from the sulphonation of benzene. Preferably, the phenol is in a form free or substantially free from alkylated phenols.

The aliphatic polyol may be, for instance, an alkylene glycol, a trihydric alcohol, a tetrahydric alcohol, a pentahydric alcohol, a hexahydric alcohol or a carbohydrate, especially mono-saccharides or oxidation products thereof or disaccharides; particularly preferred aliphatic polyols are those saturated polyols containing one or more divalent hydroxy methylene groups >CHOH in the chain of their molecules. When using an alkanediol (or "alkylene glycol"), the divalent "alkylene" portion of its molecule can be of straight or branched chain and preferably contains from 3 to 10 carbon atoms.

Examples of preferred alkylene glycols include 1,2-propanediol, 1,2-butanediol, 1,3-butanediol, 2,3-butanediol, 1,2-pentanediol, 1,4-pentanediol, 2,3-pentanediol, 2-methyl-2, 4-pentanediol, and 2,3-hexanediol.

If the aliphatic polyol is a trihydric alcohol this may be, for instance glycerol. If the aliphatic polyol is a tetrahydric alcohol, it may be for example erythritol. Pentahydric alcohols suitable for use in the reaction with phenol include, for example, arabitol or xylitol. If the aliphatic polyol is a hexahydric alcohol it may be, for instance, mannitol or sorbitol.

Preferred classes of aliphatic polyol reactants are those falling within the mono- and di-saccharide groups of carbohydrate compounds. Among the mono-saccharide group of compounds, suitable polyols include, for instance, trioses such as glyceric aldehyde and dihydroxy-acetone; tetroses such as erythrose: pentoses, such as arabinose, xylose and ribose and the methyl-pentose, rhamnose; hexoses such as glucose, gulose, mannose, galactose and talose; and the heptose, glucoheptose. Alternatively, oxidation products of monosaccharides such as the gluconic acids and the lactones thereof, for instance, glucono-δ-lactone, and the saccharic acids may also be employed. Suitable di-saccharide compounds include, for example, sucrose, lactose, maltose, cellobiose, gentiobiose and melibiose.

The reaction of phenol and various aliphatic polyols has been described in U.S. Pat. 1,593,342; 1,832,038; 1,845,314; 1,868,215; 1,868,216; 1,923,321; 2,001,430; 2,252,725; and 2,798,079.

The reaction of the phenol and aliphatic polyol is effected at an elevated temperature which may be within the range of from 50° to 250° C., more preferably within the range of from 100° to 200° C., the choice of the reaction temperature depending to a large exetent on the nature of the polyol reactant. While the reaction may be effected at super-atmospheric pressure or sub-atmospheric pressure if desired, the use of atmospheric pressure in the reaction is preferred. Preferably, water formed during the reaction is removed continuously. The length of the reaction period may be, for example, within the range of from 1 hour to 10 hours, a period within the range of from 2 hours to 8 hours being preferred.

It is preferred that an acidic catalyst is present during the reaction of the phenol and the polyol. It is possible however to obtain products exhibiting high activity in tin-plating processes by effecting the reaction in the absence of added catalyst and this is probably due to the phenol reactant being itself slightly acidic.

Acidic catalysts suitable for use in the reaction include those of the Lewis acid or Bronsted acid types. Examples of Lewis acids which may be used include aluminium chloride, ferric chloride, stannic chloride, zinc chloride, boron trifluoride and complexes thereof for instance with water or with diethyl ether, and titanium tetrachloride. Examples of Bronsted acids which may be used include sulphuric acid, phenol sulphonic acid, acetic acid, ortho-phosphoric acid, ortho-boric acid, para-toluene sulphonic acid, perchloric acid, sulphonated polystyrene resins or other acid forms of ion-exchange resins and acid-treated montmorillonite and other activated clays and earths. Alternatively, metallic aluminium may be employed as catalyst. The proportion of catalyst present in the reaction mixture is preferably within the range of from 0.001% to 10% by weight, and especially from 0.05% to 5% by weight, based on the weight of the phenol present initially in the reaction mixture.

The proportion of phenol starting-material to that of aliphatic polyol in the reaction mixture is preferably within the range of from 1:1 to 10:1 molar proportions respectively. More preferably, a proportion of phenol to that of aliphatic polyol within the range of from 1:1 to 3.5:1 molar proportions respectively.

Although the crude mixture from the reaction of the phenol and the aliphatic polyol may be employed without purification in a tin-plating bath, the mixture is advantageously purified before such use. For instance, if a solid catalyst has been used, this may be removed by filtration, preferably after the reaction mixture has been diluted with water to facilitate filtration of the viscous reaction product. Subsequently, any unreacted phenol and/or polyol starting-materials and water formed during the reaction and not previously removed may be taken off, for instance by distillation under reduced pressure.

The products from the reaction of phenols and aliphatic polyols according to the process described hereinbefore have been found to exhibit high activity when incorporated into tin-plating baths, their addition increasing the range of current density over which acceptable plating can be obtained.

However, certain of the products notably those derived from alkylene glycols may require a further treatment in order to improve the solubility of these products in conventional tin-plating baths.

Accordingly, the present invention provides, as a second aspect, a process for producing a tin-plating bath additive comprising contacting with ethylene oxide at an elevated temperature the product produced by heating together, at an elevated temperature, phenol and an aliphatic polyol containing from 2 to 8 hydroxy groups per molecule.

The process according to the second aspect of the present invention is advantageously effected by heating the reaction product from the phenol and the aliphatic polyol with a substantial excess amount of ethylene oxide, preferably a proportion of ethylene oxide of from about one up to 20 molecular proportions per molar proportion of said phenol/polyol reaction product being used. Although the process according to the second aspect of the present invention may be effected within a wide range of temperature for instance at a temperature within the range of from 50° to 300° C., it is preferred to use a temperature within the range of from 100° to 200° C. In order that loss of ethylene oxide reactant may be avoided, it is convenient to operate this process in a sealed reactor. The presence of small amounts of alkaline materials has a beneficial effect on the reaction rate and it is therefore preferred that an amount of up to 5% by weight on the total reaction mixture of an alkaline material is used. Suitable alkaline materials include alkali metal hydroxides such as sodium or potassium hydroxide. The length of the reaction period is not critical and a reaction period of up to 5 hours is normally adequate.

The present invention also provides, as a third aspect, a process for producing a tin-plating bath additive comprising contacting with sulphuric acid either the product of the process of heating together at an elevated temperature phenol and an aliphatic polyol, containing from 2 to 8 hydroxyl groups per molecule or the ethylene oxide condensate of said phenol/polyol reaction product.

The process according to the third aspect of the present invention may be conveniently effected by contacting the phenol/polyol reaction product or the phenol/polyol/ethylene oxide reaction product with sulphuric acid whilst stirring the mixture at a temperature within the range of from 25° to 200° C. more preferably at a temperature within the range of from 25° to 150° C. It is usually convenient to use sulphuric acid in the form of the concentrated aqueous solution of the acid, but other forms of the concentrated acid such as oleum may be employed if desired. The relative proportions of phenol-polyol reaction product or the ethylene oxide condensate derived therefrom to sulphuric acid are not critical and molar ratio of sulphuric acid to phenol/polyol reaction product within the range of from 0.5:1 to 2.0:1 is normally adequate in order to achieve products possessing good solubility properties in conventional tin-plating baths. The length of the reaction period is not critical and a reaction period of up to 5 hours is normally adequate.

Preferably the reaction product of the phenol/polyol used in the processes according to the second and third aspects of the present invention is a product freed from any insoluble catalyst which may have been employed in the reaction.

The need to increase the tin-plating bath solubility mentioned hereinbefore, applies primarily to the phenol/polyol products derived from alkylene glycols. Consequently, processes according to the second and third aspects of the present invention are mainly of interest in those cases in which the aliphatic polyol employed therein is an alkylene glycol or a lactone of a gluconic acid, for instance glucono-δ-lactone. Where a higher polyol is employed the necessity of increasing both solubility is not so important, although the said solubilising processes may be applied to such products if desired.

The present invention also embraces, as further embodiments, an acidic tin-plating bath comprising an additive produced by contacting, at an elevated temperature, a phenol and an aliphatic polyol containing from 2 to 8 hydroxyl groups per molecule; an acidic tin-plating bath comprising the additive consisting of the product of the process according to the second aspect of the present invention; a tin-plating bath comprising the reaction product of the process according to the third aspect of the present invention; and methods of tin-plating from baths comprising the reaction product of the process according to the second or third aspects of the present invention.

The tin-plating processes and baths of the present invention give rise to excellent deposits over a very wide range of current density. By means of the said processes integral semi-bright tin coatings may be obtained which, on flow-melting, give bright tin plate from "pin-holes" or "orange-peel" effects and of high adhesion values.

The condensation product of phenol and polyol should be added to tin-plating baths according to the invention in effective amounts of at least 0.1 up to 20 grams or, to obtain safer results, about 1 to 10 grams per liter of plating bath. Optimal results, i.e. attainment of a bandwidth of about 9 cm., were achieved with amounts of 4 to 5 grams per liter of the aforesaid condensation product.

The present invention is further illustrated by the following examples. Parts by weight shown therein bear the same relation to parts by volume as do kilograms to litres.

EXAMPLE 1

(A) 90 parts of 2,3-butanediol were added slowly to a stirred mixture of 188 parts of phenol and 9.4 parts of activated montmorillonite (e.g. "Fulmont 237" catalyst) at a temperature in the range of from 160° to 180° C. Water formed during the reaction was removed continuously. After a reaction period of seven hours 29 parts of water had been removed in this way. The reaction mixture was then heated under reduced pressure (15 millimetres of mecury pressure) in order to strip off unreacted starting-materials from the mixture. The product (60 parts) was a dark-brown viscous liquid. Its solidification range is 10–13° C.

The product was not entirely soluble in a "Ferrostan" tin-plating bath, but was however employed in the following Hull cell test. A plating bath was made up containing 30 grammes per litre of stannous ions added as stannous sulphate and 17.5 grammes per litre acidity calculated as sulphuric acid ($H_2SO_4$) but added as phenol sulphonic acid. 0.1 gramme of the product of Example 1 was incorporated into 250 millilitres of this solution which was then placed in a Hull cell (capacity 300 millilitres), and a steel cathode was plated from this solution for one minute at a total current of one ampere. The plating procedure was then repeated using a new cathode for the same time but using a total current of three amperes. In each test the bath temperature was maintained at 50° C. throughout the test.

On examining the cathode it was observed that for the one ampere test the commencement of acceptable plating occurred immediately at the high-current density end of the cathode and extended at 9.9 centimetres from the high-current density end. In the three ampere test, plating began 4.0 centimetres from the high-current density end of the cathode and the band which was 5.1 centimetres. By "acceptable plating" is meant the deposition of an integral, semi-bright tin coating which, on flow-melting, gives a bright tin-plating free from "pin-holes" or "orange-peeling" and of good adhesion.

(B) 5.5 parts of the product obtained by the reaction of 2,3-butanediol and phenol as descrbied in Example 1A, 9 parts of ethylene oxide and 0.01 part of sodium hydroxide were placed in a sealed rocking reactor and nitrogen gas introduced until the internal pressure was ten atmospheres. The reactor was set in motion and the internal temperature raised to 110° C. and maintained at this temperature for 8 hours. The reaction product (13 parts) was a brown viscous liquid. This product was found to be completely soluble in the tin-plating bath described in Example 1A.

The Hull cell test results on the product were as follows:

Weight of sample _____gramme__ 1
1 ampere:
    Position _____cm__ 0.5
    Band width _____cms__ 6.6
3 amperes:
    Position _____cms__ 4.8
    Band width _____cms__ 4.2

(C) 6 parts of the viscous brown liquid product of Example 1B and 1.0 part of concentrated sulphuric acid were stirred together at 40° C. for one hour. The product was cooled to 25° C. and was found to be completely soluble in the tin-plating bath described in Example 1A. The Hull cell test results on this sulphonated compound were as follows:

Weight of sample _____grammes__ 1.0
1 ampere:
    Position _____cms__ 0.5
    Band width _____cms__ 5.4
3 amperes:
    Position _____cms__ 4.8
    Band width _____cms__ 3.9

EXAMPLE 2

118 parts of hexylene glycol(2-methylpentane-2,4-diol), 94 parts of phenol and 4.7 parts of "Fulmont 237" catalyst were heated together under the conditions described in Example 1 to give 91 parts of a dark-brown viscous liquid. This product gave the following results in the Hull cell tests described in detail in Example 1:

Weight of sample _____grammes__ 0.1
1 ampere:
    Position _____cms__ 0.0
    Band width _____cms__ 9.9
3 amperes:
    Position _____cms__ 4.5
    Band width _____cms__ 5.4

Similar results were obtained when the hexylene glycol used in Example 2 was replaced by one of the following glycols:
    1,2-propanediol
    1,2-butanediol
    1,3-butanediol
    1,2-pentanediol
    1,4-pentanediol
    2,3-pentanediol or 2,3-hexanediol

EXAMPLE 3

117.5 parts of phenol, 85.6 parts of sucrose and 2.5 parts of "Fulmont 237" were heated together with stirring to 150° C. over a period of three hours. The reaction mixture was maintained at this temperature for a further eleven hours. After cooling, the reaction product was dissolved in 200 parts of water and the catalyst removed by filtration. Removal of water and unreacted starting-material under 15 millimetres of mercury pressure gave a brittle, dark-brown solid. The product was partially soluble in water and the conventional tin-plating bath described in Example 1 and was therefore used directly in the Hull cell tests. The results obtained in the Hull cell tests may be summarised thus:

Weight of sample _____grammes__ 1.0
1 ampere:
    Position _____cms__ 0.2
    Band width _____cms__ 9.0
3 amperes:
    Position _____cms__ 4.2
    Band width _____cms__ 5.8

EXAMPLE 4

(A) 94 parts of phenol and 59 parts of glucono-δ-lactone were heated at 95° C., with stirring, for 8 hours in the presence of 4.7 parts of phenol sulphonic acid catalyst. During this time, water formed during the reaction and some unreacted phenol were allowed to distil over from the reaction vessel.

The dark-red product was partially soluble in the tin-plating bath described in Example 1 and was therefore employed directly in the Hull cell tests. The Hull cell tests may be summarised thus:

Weight of sample _____grammes__ 1.0
1 ampere:
    Position _____cms__ 0.0
    Band width _____cms__ 9.3
3 amperes:
    Position _____cms__ 4.3
    Band width _____cms__ 5.7

(B) In order to improve the water solubility of the product from Example 4, the crude product was treated in the following manner. 25 parts of the product were heated with 10 parts of concentrated sulphuric acid for one hour at 100° C. On cooling it was found that the sulphonated product was substantially completely soluble in water and in the conventional tin-plating bath described in Example 1. The Hull cell test results on the sulphonated product were as follows:

Weight of sample _____grammes__ 1.0
1 ampere:
    Position _____cms__ 0.0
    Band width _____cms__ 6.0
3 amperes:
    Position _____cms__ 3.8
    Band width _____cms__ 4.8

EXAMPLE 5

A mixture of 94 parts of phenol, 90 parts of glucose (molar ratio phenol:glucose 1:0.5) and 4.7 parts of "Pulmont 237" catalyst was heated at 140° C., with stirring, for 26 hours. Water mixed with a little phenol starting-material, was allowed to distil from the reaction mixture during the heating period. The crude reaction product was dissolved in 500 parts of water maintained at 90° C. The solution was allowed to cool and was then filtered. The clear brown filtrate was evaporated to dryness under reduced pressure in a rotary evaporator. The product was a brown friable solid.

The product was completely soluble in the tin-plating bath described in Example 1 and gave the following Hull cell test results:

Weight of sample _____grammes__ 1.0
1 ampere:
    Position _____cms__ 0.0
    Band width _____cms__ 5.6
3 amperes:
    Position _____cms__ 2.9
    Band width _____cms__ 4.9

EXAMPLE 6

A mixture of 188 parts of phenol, 60 parts of glucose (molar ratio phenol:glucose 6.0:1) and 0.25 part of phenol sulphonic acid was heated at 140° C., with stirring, for 8 hours. Water, mixed with a small amount of phenol starting-material, was allowed to distil from the reaction mixture during the heating period. The reaction mixture was then heated at 90° C. under a subatmospheric pressure of 15 millimetres of mercury pressure in order to remove unreacted phenol starting-material. The crude product was then dissolved in 400 parts of hot (90° C.) water and the solution allowed to cool to 25° C. After filtration using 2 parts of "Fulmont 237" montmorillonite as a filter-aid, the clear brown filtrate was evaporated to dryness at 50° C. under reduced pressure in a rotary evaporator. The product was a brown friable solid.

The product was completely soluble in the tin-plating bath described in Example 1 and gave the following Hull cell test results:

Weight of sample _____ grammes__ 1.0
1 ampere:
  Position _____ cms__ 0.1
  Band width _____ cms__ 7.7
3 amperes:
  Position _____ cms__ 3.3
  Band width _____ cms__ 6.7

EXAMPLE 7

94 parts of phenol, 180 parts of glucose (molar ratio phenol:glucose 1:1) and 0.13 part of phenol sulphonic acid were mixed together and the mixture heated with stirring, to 155° C. After heating at this temperature, a sample was taken of the reaction mixture (Product A). Heating of the mixture was then continued for a further three hours after which time the reaction mixture was cooled to 25° C. 400 parts of water were added and the diluted mixture heated to 95° C. After cooling the solution was filtered and evaporated to dryness as described in Examples 5, 6 and 7, to give a brown friable solid (Product B).

Product A was substantially completely soluble in the tin-plating bath described in Example 1 although the solution was somewhat cloudy and the formation of a small amount of tar was observed. The Hull cell test results for this compound were as follows:

Weight of sample _____ grammes__ 1.0
1 ampere:
  Position _____ cms__ 0.1
  Band width _____ cms__ 9.0
3 amperes:
  Position _____ cms__ 3.4
  Band width _____ cms__ 6.6

Product B was completely soluble in the tin-plating bath and showed no evidence of tar formation. The hull cell tests in respect of this compound were as follows:

Weight of sample _____ grammes__ 1.0
1 ampere:
  Position _____ cms__ 0.3
  Band width _____ cms__ 8.3
3 amperes:
  Position _____ cms__ 2.5
  Band width _____ cms__ 7.4

Although Product B was slightly inferior in terms of activity, it had the advantage over Product A that no tar was present in the bath so that the possibility of fouling the tin deposit was avoided.

EXAMPLE 8

A mixture of 188 parts of phenol, 90 parts of glucose (molar ratio phenol:glucose 4:1) and 0.12 part of phenol sulphonic acid was heated to 155° C. with stirring. Water and a small amount of phenol were allowed to distil from the reaction mixture during the reaction. After heating for nine hours, the reaction mixture was allowed to cool to 25° C. Unreacted phenol was removed by distillation at 100° C. under a subatmospheric pressure of 15 millimetres of mercury. The still residues were dissolved in 400 parts of water and 0.2 part of sodium carbonate was added. The solution was heated to 95° C. and then allowed to cool to 25° C. The solution was filtered and evaporated to dryness in a rotary evaporator to give a brown friable solid.

This product was completely soluble in the tin-plating bath described in Example 1 and gave the following hull cell test results:

Weight of sample _____ grammes__ 1.0
1 ampere:
  Position _____ cms__ 0.0
  Band width _____ cms__ 7.3
3 amperes:
  Position _____ cms__ 2.4
  Band width _____ cms__ .69

EXAMPLE 9

2.9 parts of Product A of Example 7, 5.9 parts of ethylene oxide and 0.02 part of sodium hydroxide were placed in a sealed, rocking reactor and nitrogen gas introduced until the internal pressure was ten atmospheres. The reactor was set in motion and the internal temperature raised to 110° C. and maintained at this temperature for five hours. The crude reaction product, 7.5 parts, was a brown viscous liquid.

This product was found to be completely soluble in the tin-plating bath described in Example 1. In addition, when the product was incorporated into said tin-plating bath in an amount of 4% weight/volume, and the plating solution thus prepared was boiled for five minutes, no sign of precipitation of solid material from the bath was observed.

The Hull cell test results on the reaction product were as follows:

| | 1 ampere | | 3 amperes | |
|---|---|---|---|---|
| Weight of sample | Position, cms. | Band width, cms. | Position, cms. | Band width, cms. |
| 1.0 gramme | 0.0 | 7.0 | 4.5 | 5.1 |
| 0.5 gramme | 0.0 | 7.0 | 3.5 | 5.0 |

EXAMPLE 10

1.0 part of the product from Example 9 and 0.2 part of concentrated sulphuric acid were stirred together for 1 hour at 40° C., to give a dark-brown viscous liquid.

This product was completely soluble in the tin-plating bath described in Example 1 and gave the following Hull cell results:

Weight of sample _____ grammes__ 1.0
1 ampere:
  Position _____ cms__ 0.0
  Band width _____ cms__ 7.0
3 amperes:
  Position _____ cms__ 4.5
  Band width _____ cms__ 5.0

I claim:
1. In tin-plating a surface by electrodepositing thereon tin from an aqueous acid tin-plating bath, the improvement comprising adding to the aqueous tin-plating bath from 0.1 to 20 g. per liter of said bath of a plating improving agent selected from (a) a condensation product of phenol and an aliphatic polyol having from 2 to 8 hydroxyl groups per molecule in 1:1 to 10:1 molar proportions respectively, the condensation reaction being carried out at a temperature of from 50° to 250° C. for a period of 1 to 10 hours; (b) an additional product of said condensation product with, per mole of the latter, from about one to 20 moles of ethylene oxide, the addition reaction being carried out at a temperature of from 50° to 300° C. for a period of up to 5 hours; (c) a sulfated derivative of said condensation product, and (d) a sulfated derivative of said addition product, said sulfated condensation and addition products having been obtained by reacting said addition or condensation products with sulfuric acid at a molar ratio of from 0.5 to 1 to 2 to 1 respectively at a temperature of from 25° to 200° C. for a period of up to 5 hours.

2. The process as claimed in claim 1, wherein said phenol is free or substantially free from alkylated phenol.

3. The process as claimed in claim 2, wherein at least one hydroxyl group in the molecule of said polyol pertains to a divalent hydroxymethylene group.

4. The process as claimed in claim 3, wherein said polyol is one of the following: 1,2-propanediol, 1,2-butanediol, 1,3-butanediol, 2,3-butanediol, 1,2-pentanediol, 1,4-pentanediol, 2,3-pentanediol, 2-methyl-2,4-pentanediol, or 2,3-hexanediol, glycerol, erythritol, arabitol, xylitol, mannitol, sorbitol, a monosaccharide, an oxidation product of monosaccharide selected from gluconic acid or a lactone thereof, or a disaccharide.

5. The process as claimed in claim 4, wherein said monosaccharide is a triose, a tetrose, a pentose, a hexose or a heptose.

6. The process as claimed in claim 4, wherein said polyol is one of the following: glyceraldehyde, dihydroxyacetone, erythrose, arabinose, xylose, ribose, rhamnose, glucose, gulose, mannose, galactose, talose, glucoheptose, glucono-δ-lactone, saccharic acid, sucrose, lactose, maltose, cellobiose, gentiobiose, melibiose.

7. The process as claimed in claim 3, wherein said polyol is an alkylene glycol having from 3 to 10 carbon atoms.

8. The process as claimed in claim 1, wherein said aliphatic polyol is a saturated polyol selected from an alkylene glycol, a trihydric alcohol, a tetrahydric alcohol, a pentahydric alcohol, a hexahydric alcohol or a carbohydrate.

9. The process as claimed in claim 1, wherein the molar ratio of phenol to polyol in said condensation product ranges from about 1:1 to 3.5:1.

10. The process as claimed in claim 1, wherein said plating-improving agent is added to said bath, per liter of the latter, in an amount of from 1 to 10 grams.

11. In an aqueous acid tin-plating bath, the improvement consisting of the aqueous bath containing from 0.1 to 20 g. per liter of said bath of a plating-improving agent selected from (a) a condensation product of phenol and an aliphatic polyol having from 2 to 8 hydroxyl groups per molecule in 1:1 to 10:1 molar proportions respectively, the condensation reaction being carried out at a temperature of from 50° to 250° C. for a period of 1 to 10 hours; (b) an addition product of said condensation product with, per mole of the latter, from about 1 to 20 moles of ethylene oxide, the addition reaction being carried out at a temperature of from 50° to 300° C. for a period of up to 5 hours; (c) a sulfated derivative of said condensation product, and (d) a sulfated derivative of said addition product, said sulfated condensation and addition products having been obtained by reacting said addition or condensation products with sulfuric acid at a molar ratio of from 0.5 to 1 to 2 to 1 respectively at a temperature of from 25° to 200° C. for a period of up to 5 hours.

12. The bath as claimed in claim 11, wherein the amount of said condensation product ranges from 1 to 10 grams per liter of said bath.

References Cited

UNITED STATES PATENTS

| 1,987,749 | 1/1935 | Pine | 204—54 |
| 2,271,209 | 1/1942 | Schlötter | 204—54 X |
| 2,457,152 | 12/1948 | Hoffman | 204—54 |
| 3,404,075 | 10/1968 | Aiken et al. | 204—54 |
| 3,483,099 | 12/1969 | Watanabe | 204—54 |
| 3,515,653 | 6/1970 | Sykes | 204—54 |

FOREIGN PATENTS

| 338,862 | 3/1936 | Italy | 204—54 |

GERALD L. KAPLAN, Primary Examiner

U.S. Cl. X.R.

204—DIG. 2